United States Patent
Homma et al.

(10) Patent No.: US 7,361,618 B2
(45) Date of Patent: Apr. 22, 2008

(54) CARBON FIBER-MADE REINFORCING WOVEN FABRIC AND PREPREG AND PREPREG PRODUCTION METHOD

(75) Inventors: Kiyoshi Homma, Shiga (JP); Akira Nishimura, Kyoto (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/499,241

(22) PCT Filed: Dec. 19, 2001

(86) PCT No.: PCT/JP01/11141

§ 371 (c)(1), (2), (4) Date: Jun. 17, 2004

(87) PCT Pub. No.: WO03/052185

PCT Pub. Date: Jun. 26, 2003

(65) Prior Publication Data
US 2005/0085147 A1    Apr. 21, 2005

(51) Int. Cl.
*B32B 5/08*    (2006.01)
(52) U.S. Cl. .............. 442/219; 442/2; 442/5; 442/21; 442/43; 442/149; 442/172; 442/175; 442/179; 442/180; 442/203; 442/208; 442/209; 442/210; 442/215; 442/218; 442/220
(58) Field of Classification Search .......... 442/149, 442/172, 175, 179, 180, 203, 208, 209, 210, 442/215, 218, 219, 220, 2, 5, 21, 43
See application file for complete search history.

(56) References Cited

U.S. PATENT DOCUMENTS

| | | | |
|---|---|---|---|
| 3,788,365 A | * | 1/1974 | Campbell et al. ........... 139/421 |
| 4,906,506 A | * | 3/1990 | Nishimura et al. ......... 428/113 |
| 5,168,006 A | * | 12/1992 | Inoguchi et al. ............ 442/187 |
| 5,783,278 A | * | 7/1998 | Nishimura et al. ......... 428/102 |

FOREIGN PATENT DOCUMENTS

| | | |
|---|---|---|
| EP | 144939 A | 6/1985 |
| GB | 2091633 A | 8/1982 |
| JP | 62-6932 A | 1/1987 |
| JP | 10-317250 | * 12/1998 |
| JP | 10-317250 A | 12/1998 |

OTHER PUBLICATIONS

Japanese Patent 10-317250 Translation Document, Reinforcing Fiber Woven Fabric And Method For Manufacturing The Same, Akira Nishimura et al., Translated by: Schreiber Translations, Inc.*

* cited by examiner

Primary Examiner—Andrew T Piziali
(74) Attorney, Agent, or Firm—DLA Piper US LLP

(57) ABSTRACT

A carbon fiber-made reinforcing woven fabric comprising a carbon-fiber woven fabric formed from warps consisting of carbon fibers and wefts consisting of carbon fibers, and auxiliary yarns arranged along at least either warps or wefts, the auxiliary yarns being passed over and under other yarns differently from associated warps or wefts. When prepreg is produced by applying matrix resin to this woven fabric by a wet/prepreg processing method before drying, the presence of auxiliary yarns in gaps in the vicinities of warp-weft intersections on the woven fabric allows matrix resin to remain around auxiliary yarns to produce no apertures in the obtained prepreg, whereby the woven fabric is suitable for a prepreg production by wet/prepreg processing.

14 Claims, 3 Drawing Sheets

CARBON FIBER-MADE REINFORCING WOVEN FABRIC AND PREPREG AND PREPREG PRODUCTION METHOD

TECHNICAL FIELD

The present invention relates to a carbon fiber-made reinforcing woven fabric, a prepreg, and a method for producing the prepreg.

The carbon fiber-made reinforcing woven fabric of the invention is used as a reinforcing material for a fiber-reinforced composite material such as fiber-reinforced plastic. Furthermore, the carbon fiber-made reinforcing woven fabric of the invention can be used as a component of a prepreg when a fiber-reinforced composite material is produced from a matrix resin and reinforcing fibers.

BACKGROUND ART

Carbon fiber-reinforced plastics using carbon fibers as reinforcing fibers (hereinafter called CFRPs) are excellent in specific strength and specific modulus, and hence are used as aircraft members, since the fuel consumption can be remarkably improved because of their lightweight. Especially as the secondary structural materials such as the flaps, fairings and ailerons and interior materials such as toilet rooms, ceiling panels and luggage compartments respectively of aircraft, used are honeycomb sandwich structural bodies, each comprising a core member having a honeycomb structure and plate-like skin members bonded to both the surfaces of the core member. CFRPs are popularly used as members constituting the skin members.

A honeycomb sandwich structural body is formed by overlaying a prepreg composed of a carbon fiber woven fabric as skin member on a core member having a honeycomb structure, and curing a thermosetting resin in the prepreg simultaneously with bonding between the honeycomb structure and CFRP under heating and pressurizing. This production method is usually called the honeycomb co-curing method.

The conventional carbon fiber woven fabric used as a component of a prepreg in the honeycomb co-curing method is as shown in FIG. 5. A carbon fiber woven fabric 50 shown in FIG. 5 comprises carbon fiber warp yarns 51 and carbon fiber weft yarns 52, and has large open spaces (gaps) 56 formed near the intersections between the warp yarns 51 and the weft yarns 52, where no carbon fibers exist. The prepreg is formed by impregnation of a matrix resin into the carbon fiber woven fabric 50.

When the prepreg is molded to produce a honeycomb sandwich structural body, the prepreg is pressurized in the portions in contact with the honeycomb core, but is not pressurized at the portions not in contact with the core. In this production process, the gaps 56 of the carbon fiber woven fabric 50 are likely to be devoid of the resin. If the voids are devoid of the resin, there arises a problem that the skin members of the produced honeycomb sandwich structural body has holes formed. If such a defective honeycomb sandwich structural body is used, water goes from the holes into the cavities of the honeycomb, and there arises a serious problem that if the water is frozen to expand, the honeycomb sandwich structural body may be destroyed.

To avoid this problem, it is practiced to use a woven fabric composed of relative thin carbon fiber yarns, each consisting of 3,000 filaments and having a relatively small fineness of 1,800 deniers, as the woven fabric for the honeycomb co-curing method. The carbon fiber woven fabric is small in the size of open spaces.

However, the productivity of such thin carbon fiber yarns is low, and the speed at which a woven fabric composed of them is produced is also low. So, the honeycomb sandwich structural is body produced using the woven fabric has a problem of high cost, even though it is immune from the aforesaid problem.

On the other hand, to raise the productivity and to obtain low cost CFRP, it is advantageous to produce thick carbon fiber yarns and to use them for producing a woven fabric. However, in the case where a thin woven fabric having a low unit weight is produced using thick carbon fiber yarns, there arises a problem that the produced woven fabric has large gaps formed near the interlaced portions between warp yarns and weft yarns, where no carbon fibers exist.

Furthermore, JP 7-300739 A proposes a woven fabric composed of thick carbon fiber yarns in each of which carbon fibers forming the yarn are uniformly and flatly dispersed. In the woven fabric, since the warp yarns and the weft yarns are interlaced with each other in such a state that the carbon fiber yarns used as the warp yarns and the weft yarns are kept flat in cross sectional form, the crimps formed by the warp yarns and the weft yarns are small, and the mechanical properties of the CFRP produced using the woven fabric are very excellent.

However, since the warp yarns and the weft yarns of the flat carbon fiber yarn woven fabric are interlaced with each other with crimps slightly formed, the forces for placing positions of the warp yarns or the weft yarns under restraint at the interlaced portions are extremely small. In the case where this woven fabric is processed by a wet-prepreg processing, when the solvent is dried away, the flat warp yarns and the flat weft yarns are deformed and bundled roundly due to the surface tension of the resin. As a result, a prepreg having large open spaces is produced as a problem of this technique.

To overcome the problem, JP 10-317250 A proposes a woven fabric, in which auxiliary yarns obtained by covering hardly heat shrinkable yarns with an adhesive polymer are paralleled with carbon fiber warp yarns or carbon fiber weft yarns, to bond the warp yarns and the weft yarns to each other at their intersections by the adhesive polymer. If the warp yarns and the weft yarns are bonded to each other at their intersections like this, the degree of yarn bundling in the yarn width direction caused when the solvent is dried away in a wet-prepreg processing process can be lowered.

However, since the auxiliary yarns covered with an adhesive polymer are paralleled with the carbon fiber yarns, they can migrate into the carbon fiber yarns, and all the intersections between the warp yarns and the weft yarns cannot be stably bonded. So, there arises a problem that large open spaces can be partially formed in a wet-prepreg processing. Furthermore, the polymer used as an adhesive exists almost in the central portions in the yarn width direction of the warp yarns and the weft yarns, but does not exist near the gaps 56 formed due to the interlacing between the warp yarns and the weft yarns. So, there arises a problem that a wet-prepreg processing is likely to expand the gaps 56 small in the beginning.

As described above, even though a flat carbon fiber yarn woven fabric is excellent in performance and cost, there has been no method of reliably preventing the formation of open spaces in a wet-prepreg processing. That is, the above-mentioned prior art does not solve the problem that open spaces are formed in a wet-prepreg.

It would accordingly be helpful to provide a carbon fiber-made reinforcing woven fabric comprising warp yarns, each of which is composed of carbon fibers, and weft yarns, each of which is composed of carbon fibers, wherein dispersion of the carbon fibers is substantially uniform in the plane direction of the carbon fiber woven fabric, and wherein gaps formed near the interlaced portions between the warp yarns and the weft yarns are small and a cover factor is large.

It would also be helpful to provide a prepreg produced by processing the carbon fiber-made reinforcing woven fabric of the invention under a wet-prepreg processing, and also to provide a method for producing the prepreg.

DISCLOSURE OF THE INVENTION

The carbon fiber-made reinforcing woven fabric of the invention comprises warp yarns each of which is composted of carbon fibers and weft yarns each of which is composed of carbon fibers, and auxiliary yarns arranged along at least either the warp yarns or the weft yarns, wherein each of the auxiliary yarns is arranged with an up and down pattern which is different from that of the mating warp yarn or the mating weft yarn.

It is preferred that each of the auxiliary yarns is arranged between the warp yarns adjacent each other or between the weft yarns adjacent each other.

It is preferred that each of the auxiliary yarns is a yarn having a low heat shrinkable property and on the surface thereof a low melting point polymer is adhered, and that portions of the intersections between the auxiliary yarns and the warp yarns or the weft yarns are bonded by means of the low melting point polymer.

It is preferred that the yarn having a low heat shrinkable property is a glass fiber yarn having a fineness of not more than 500 deniers.

It is preferred that an adhering amount of the low melting point polymer is in a range from 0.5 to 10 wt % based on the weight of the reinforcing woven fabric.

It is preferred that the low melting point polymer is adhered on the surface of the yarn having a low heat shrinkable property spirally in at least either S-direction or Z-direction.

It is preferred that the low melting point polymer is a polymer having a hardly soluble property in alcohol.

It is preferred that the respective finenesses of each of the warp yarns and each of the weft yarns are in a range from 3,000 to 90,000 deniers, that an areal weight of the carbon fiber woven fabric is in a range from 100 to 600 g/m², and that a cover factor of the reinforcing woven fabric is not less than 90%.

It is preferred that a low melting point polymer is adhered dottedly or lineally on at least either the warp yarns or the weft yarns in the longitudinal direction of the yarns, and that portions of the intersections between the warp yarns and the weft yarns are bonded by means of the low melting point polymer.

It is preferred that the warp yarns and the weft yarns form a plain weave structure.

It is preferred that the warp yarns and the weft yarns form a 2/2 twill weave structure.

It is preferred that the warp yarns and the weft yarns form a plain weave structure, that each of the auxiliary yarns is arranged between the warp yarns adjacent each other and is a glass fiber yarn, that a polyamide having a low melting point is adhered on the surface of the glass fiber yarn spirally at least in either S-direction or Z-direction, and that each of the auxiliary yarns is arranged with at least two continuous ups pattern to the weft yarns.

It is preferred that each of the auxiliary yarns has a two continuous ups pattern after a two continuous downs pattern to the weft yarns.

It is preferred that each of the auxiliary yarns arranged along the weft yarns is a glass fiber yarn adhered a nylon polymer having a low melting point on the surface thereof spirally in at least either S-direction or Z-direction, and that portions of the intersections between the auxiliary yarns arranged along the weft yarns and the warp yarns are bonded by means of the nylon polymer having a low melting point.

It is preferred that a nylon polymer having a low melting point is adhered dottedly or lineally on the weft yarns in the longitudinal direction of the yarns, and that portions of the intersections between the warp yarns and the weft yarns are bonded by means of the nylon polymer having a low melting point.

A prepreg of the invention comprises a carbon fiber-made reinforcing woven fabric of the invention, impregnated with 30 to 50 wt % of a resin, and has a cover factor of not less than 90%.

A method for producing a prepreg of the invention comprises the steps of impregnating the carbon fiber-made reinforcing woven fabric of the invention, with a resin diluted with a solvent, and drying the solvent.

It is preferred that the prepreg is calendered by means of calender rollers after the solvent has been dried.

1: warp yarn, 2: weft yarn, 3: auxiliary yarn arranged along warp yarn, 4: auxiliary yarn arranged along weft yarn, 5: low melting point polymer, 6: gap, 10: carbon fiber-made reinforcing woven fabric of the invention, 20: carbon fiber-made reinforcing woven fabric of the invention, 30: carbon fiber-made reinforcing woven fabric of the invention, 40: carbon fiber-made reinforcing woven fabric of the invention, 50: conventional carbon fiber-made reinforcing woven fabric, 51: warp yarn, 52 weft yarn, 56: gap, 60: carbon fiber-made reinforcing woven fabric of the invention, 61: resin bath, 62: sheet, 63: heater, and 64: prepreg.

THE BEST MODES FOR CARRYING OUT THE INVENTION

For explaining the invention in more detail, embodiments of the invention are explained in reference to the drawings.

Figure 1:
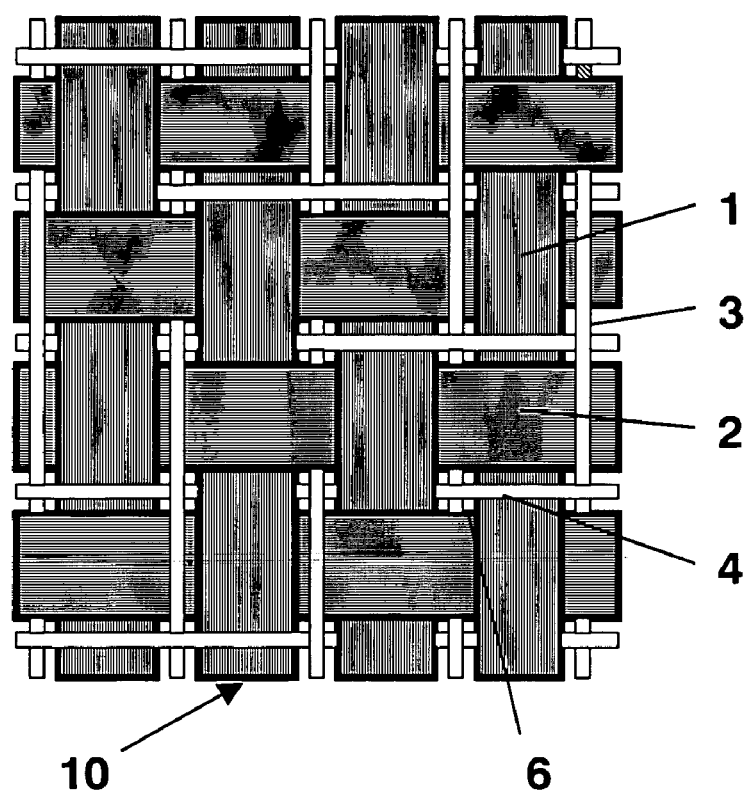
FIG. 1 is a plan view showing an example of the carbon fiber-made reinforcing woven fabric of the invention.

In FIG. 1, a plan view of a carbon fiber-made reinforcing woven fabric 10 of the invention is shown. The carbon fiber-made reinforcing woven fabric 10 comprises a carbon fiber woven fabric composed of warp yarns 1 comprising carbon fibers and weft yarns 2 comprising carbon fibers, warp-oriented auxiliary yarns 3 arranged along the warp yarns 1 and weft-oriented auxiliary yarns 4 arranged along the weft yarns 2.

The warp yarns 1 and the weft yarns 2 are interlaced with each other to form a plain weave structure. In parallel with the respective warp yarns 1, warp-oriented auxiliary yarns 3 are arranged. Furthermore, in parallel with the respective weft yarns 2, weft-oriented auxiliary yarns 4 are arranged.

Each of the warp-oriented auxiliary yarns 3 is arranged with a 2:2 sinking and floating pattern to the weft yarn 2 perpendicularly intersecting the warp-oriented auxiliary yarns 3. Furthermore, each of the weft-oriented auxiliary yarns 4 is arranged with a 2:2 sinking and floating pattern to the warp yarn 1 perpendicularly intersecting the weft-oriented auxiliary yarns 4.

That is, the up and down pattern of the warp yarn 1 to the weft yarn 2 and the up and down pattern of the warp-oriented auxiliary yarns 3 to the weft yarn 2 are different from each other, and further the up and down pattern of the weft yarn 2 to the warp yarn 1 and the up and down pattern of the weft-oriented auxiliary yarns 4 to the warp yarn 1 are different from each other.

Such yarn arrangement necessarily causes positioning the warp-oriented auxiliary yarn 3 between the warp yarns 1 adjacent each other, and further necessarily causes positioning the weft-oriented auxiliary yarn 4 between the weft yarns 2 adjacent each other. As a result, the warp-oriented auxiliary yarns 3 and the weft-oriented auxiliary yarns 4 are positioned at the centers of the gaps 6 formed near the interlaced portions between the warp yarns 1 and the weft yarns 2, and a state closing the gaps 6 is formed.

Therefore, in the carbon fiber-made reinforcing woven fabric 10, even if a resin diluted with a solvent for being lowered in viscosity gets the solvent dried away to exhibit surface tension, the resin remains around the warp-oriented auxiliary yarns 3 and the weft-oriented auxiliary yarns 4, since the auxiliary yarns 3 and the auxiliary yarns 4 exist at the positions of the gaps in the state of intersecting with each other, and the resin functions as bridges. As a result, it is prevented that the gaps 6 become devoid of the resin. That is, it is prevented that holes are formed in the gaps 6 devoid of the resin.

The carbon fiber yarns used as the warp yarns 1 and the weft yarns 2 are not especially limited. However, polyacrylonitrile-based carbon fiber yarns or pitch-based carbon fiber yarns are preferred. Polyacrylonitrile-based carbon fiber yarns are more preferred, since they can exhibit a high strength.

The fineness of the carbon fiber yarns is not especially limited. However, it is preferred that the carbon fiber yarn is a thick yarn having a fineness of not less than 3,000 deniers and having a flat cross sectional figure. The reason is that if the flat and thick carbon fiber warp yarns 1 and the flat and thick carbon fiber weft yarns 2 are interlaced with each other, with the flat figure substantially maintained, the crimps of the warp yarns 1 and the weft yarns 2 formed by the interlacing of the warp yarns 1 and the weft yarns 2 can be kept small, and therefore that the high strength and the high modulus of the carbon fibers can be fully exhibited.

On the contrary, in a woven fabric composed of a thin carbon fiber yarn having a fineness of less than 3,000 deniers, since arrangement densities of the warp and weft yarns are high, an area per one gap formed between the carbon fiber yarns is small. Therefore, it does not happen that even if a resin is deposited, the gaps become devoid of the resin. However, the productivity of the thin carbon fiber yarns are low, and moreover, since the arrangement densities of the weaving yarns are high, the productivity of the woven fabric is also low. Therefore, such a carbon fiber woven fabric becomes a very expensive material, and does not suit the present situation where the cost reduction of materials is keenly needed.

For the reasons mentioned above, it is preferred that the fineness of carbon fiber yarns is larger, since the productivity of the carbon fiber yarns and the productivity of the woven fabric produced using the carbon fiber yarns are higher to allow the production of lower cost materials. However, if very thick carbon fiber yarns are used to obtain a woven fabric having a low areal weight and a high cover factor, it is necessary to widen extremely the width of the yarn. As an actual problem, it is difficult to produce a yarn having a wide width and a uniformly widened state. Therefore, it is preferred that the fineness of the carbon fiber yarn is not more than 90,000 deniers.

After all, a preferred fineness range of the carbon fiber yarn is from 3,000 to 90,000 deniers, and a more preferred range is from 7,000 to 15,000 deniers. Furthermore, it is preferred that a width/thickness ratio showing a flatness degree of the carbon fiber yarn is not less than 5. If the flatness degree is less than 5, the effect of the invention declines, since the yarns are already condensed.

It is preferred that the warp-oriented auxiliary yarn 3 or the weft-oriented auxiliary yarn 4 is a low heat shrinkable yarn. The reason is that in a wet prepreg production process comprising the steps of impregnating the carbon fiber-made reinforcing woven fabric 10 of the invention, with a resin diluted using a solvent, and drying away the solvent to produce a prepreg, if the auxiliary yarns 3 or the auxiliary yarns 4 are thermally shrunk in the drying step, the warp yarns 1 or the weft yarns 2 are bent, since the carbon fiber warp yarns 1 or the carbon fiber weft yarns 2 are not thermally shrunk.

The examples of the low heat shrinkable yarn include aramid fibers and glass fibers. Especially glass fibers are most preferred, since they are cheap and have low heat shrinkage.

As for the modes of the auxiliary yarns 3 or the auxiliary yarn 4, ordinary filament yarns can be used, but yarns having bulky mode such as crimped-textured yarns treated to be bulky using, for example, a compressed air jet nozzle, or spun yarns are preferred. Bulky yarn can cover larger area of the gap 6, and furthermore, when it is impregnated with a resin, it is likely to be impregnated with a larger amount of the resin. So, the resin is likely to remain in the gap 6.

It is preferred that the auxiliary yarn 3 or the auxiliary yarn 4 is a fine yarn having a fineness of not more than 500 deniers, for keeping the increase in the areal weight of the woven fabric as small as possible. A fine yarn having a fineness of not more than 250 deniers is more preferred. If the auxiliary yarn 3 or the auxiliary yarn 4 is a thick yarn having a fineness of more than 500 deniers, there arise such problems that the areal weight of the woven fabric increases and that the portions of the auxiliary yarns 3 or the auxiliary yarn 4 are swollen on the surface of the woven fabric, though the areas covering the gaps 6 increase.

It is preferable that in a carbon fiber woven fabric for a carbon fiber-made reinforcing woven fabric of the invention, the counts of sinking and floating of the warp yarns 1 and the weft yarns 2 on the front side of the fabric and that on the reverse side of the fabric are the same each other. The reason is that in the case where a woven fabric in which the counts of up and down of the warp yarns 1 and the weft yarns 2 on the front side are different from those on the reverse side is impregnated with a resin and molded to produce a prepreg, since the halves of the woven fabric divided across the central plane in the thickness direction of the fabric are asymmetric in the orientation of carbon fibers, the direction in which the shrinkage stress caused by the curing and contraction of the resin acts on the front side is different from that on the reverse side, and there arises a problem that the molded CFRP (prepreg) is warped.

In the case where an even number of CFRP sheets is laminated, is if they are laminated mirror-symmetrically, the problem of warping can be solved, but it is necessary to confirm the front and reverse sides of each CFRP sheet for lamination, and this confirmation is very troublesome.

If the counts of up and down of the weaving yarns on the front side of a woven fabric are equal to those on the reverse side, the laminate formed by laminating the CFRP sheets irrespective of their sides is mirror-symmetrical without fail, and the lamination work is very easy. Furthermore, the degree of freedom in the constitution of lamination is also high.

The counts of up and down of the warp yarn 1 or the weft yarn 2 means, on viewing on the one side of the fabric, numbers of the weft yarn 2 or the warp yarn 1 on which the warp yarn 1 or weft yarn 2 passes continuously over in floating state and under in sinking sate. For example, a plain weave structure, a 2/2 twill weave structure, and a basket weave structure are woven fabrics in which the ups and downs frequencies on the front side and on the reverse side are the same each other.

In the carbon fiber-made reinforcing woven fabric of the invention, the auxiliary yarns 3 or the auxiliary yarn 4 are arranged along the warp yarns 1 or the weft yarns 2, to repeat a cycle of passing over and under the weft yarns 2 or the warp yarns 1, and the cycle is different from the corresponding cycle repeated by the mating warp yarns 1 or the mating weft yarns 2.

An up and down pattern which is different from an up and down pattern of the mating warp yarn 1 or the mating weft yarn 2 means that in FIG. 1, for example, if attention is paid to a place where a warp-oriented auxiliary yarn 3 floats over continuously two weft yarns 2, the floating pattern of a warp-oriented auxiliary yarn 3 to the first weft yarn 2 from the bottom is the same to that of the warp yarn 1 being located at the right side of the warp-oriented auxiliary yarn 3, however, to the second weft yarn 2 it is different from the warp yarn 1 being located at the right side and it is same to the floating pattern of the warp yarn 2 being located at the left side, and also at a place where a warp-oriented auxiliary yarn 3 sinks under the weft yarn 2, there is the same up and down pattern. That is, it means that the up and down pattern of the auxiliary yarn 3, 4 is different from the up and down pattern of the warp yarns 1 or the weft yarns 2 adjacent in both side thereof.

On the contrary, if the auxiliary yarns 3, 4 repeat a cycle of passing over and under the intersecting weft yarns 2 or warp yarns 1, and the cycle is the same as the cycle repeated by the mating warp yarns 1 or the mating weft yarns 2, then there occurs a phenomenon that the auxiliary yarns 3 are inclined to be closer to the warp yarns 1 repeating the same cycle of passing over and under, or that the auxiliary yarns 4 are inclined to be closer to the weft yarns 2 repeating the same cycle of passing over and under. In an extreme case, the auxiliary yarns 3 or the auxiliary yarns 4 slip into the carbon fiber yarns used as the warp yarns 1 or the weft yarns 2, and there occurs a phenomenon that the auxiliary yarns are not suitably arranged in the positions of the gaps 6.

Figure 5:
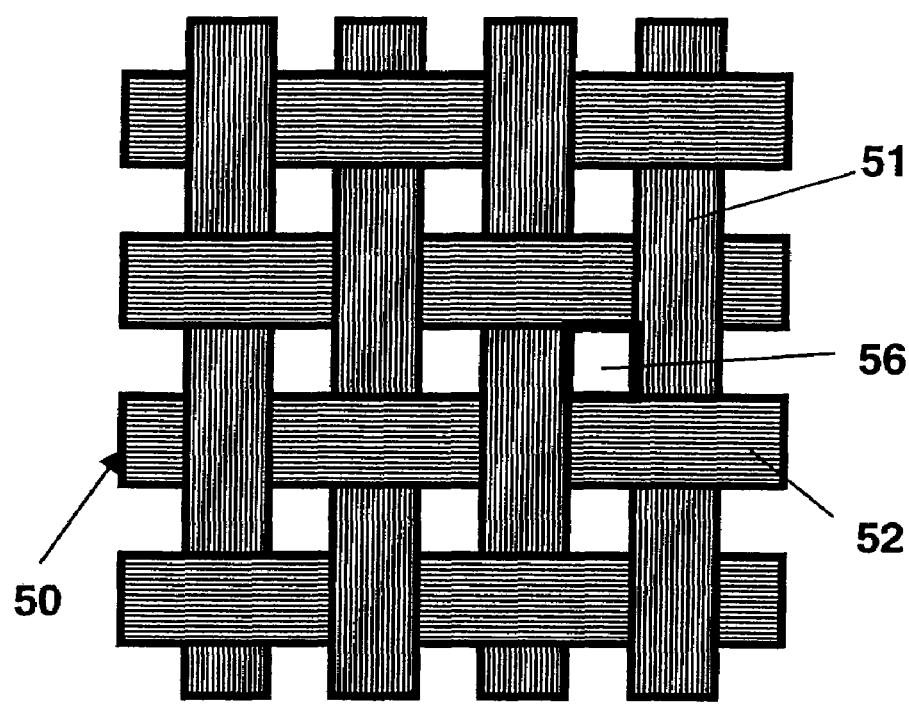
FIG. 5 is a plan view showing a conventional carbon fiber-made reinforcing woven fabric.

Such woven fabric is similar to the woven fabric 50 shown in FIG. 5, in which no fibers exist in the gaps 56 formed among the warp yarns 51 and the weft yarns 52 interlaced with each other. In such a woven fabric, when the resin deposited on the woven fabric gets its solvent dried away, the resin remaining also in the gaps 6 is drawn toward the warp yarns 1 or the weft yarns 2 due to surface tension, to form holes at the positions of the gaps 6. Furthermore, later, the warp yarns 1 or the weft yarns 2 are roundly condensed and narrowed in cross sectional figure.

In the carbon fiber woven fabric proper of the carbon fiber-made reinforcing woven fabric of the invention, it is preferred that the warp yarns 1 and/or the weft yarns 2 comprise thick carbon fiber yarns. It is further preferred that the woven fabric is a thin woven fabric having a low areal weight with the warp yarns 1 and the weft yarns 2 interlaced with each other, with the carbon fiber yarns kept flat in cross sectional figure (flat yarn woven fabric). In the flat yarn woven fabric, the areas of the gaps formed among the warp yarns and the weft yarns interlaced with each other tend to be larger, but since the auxiliary yarns satisfying the above-mentioned conditions are arranged, the problem of gaps can be substantially solved.

As for the weave structure of the auxiliary yarns 3, 4, in the embodiment shown in FIG. 1, it is proposed that an up and down pattern at 2:2 to the warp yarn 1 or the weft yarn 2 intersecting therewith. However, for example, an up and down pattern at 1:2 or 1:3 can also be employed. The up and down pattern at 1:1 (plain weave) is not preferred.

Repeating a cycle of passing over and under at 2:2 is preferred for the following reason. One of the auxiliary yarns 3 passes over or under one weft yarn like either one of the two warp yarns arranged adjacently to the auxiliary yarn 3 and passes over or under the subsequent weft yarn like the other one of the two warp yarns arranged adjacently to the auxiliary yarn 3. That is, one auxiliary yarn 3 passes over one weft yarn like the warp yarn 1 arranged on the right side of the auxiliary yarn 3, and it passes over the subsequent weft yarn like the warp yarn 1 arranged on the left side of the auxiliary yarn 3. So, it does not happen that any of the auxiliary yarns 3 comes closer to the warp yarn 1 arranged on either side of the auxiliary yarn 3, and each of the auxiliary yarns 3 can be arranged between the warp yarns 1 adjacent to the auxiliary yarn 3 preferably.

The auxiliary yarns can be arranged in both the directions of warp and weft, but can also be arranged only in one direction of either warp or weft. In the case where the auxiliary yarns are arranged in the weft direction, the auxiliary yarns must be inserted extra as weft yarns in the weaving process, to lower the productivity of woven fabric. So, it is preferred to arrange the auxiliary yarns in warp direction only.

In a woven fabric in which the gaps 6 formed near the interlaced portions between the warp yarns 1 and the weft yarns 2 are small, it is only required that yarns with an adhesive polymer deposited on them are used as the auxiliary yarns 3, 4, so that the auxiliary yarns 3, 4 can be bonded to the carbon fibers forming the warp yarns 1 and the weft yarns 2, to inhibit the carbon fiber yarns from being condensed in the yarn width direction. It is not necessary to arrange the auxiliary yarns 3, 4 along all the warp yarns 1 or all the weft yarns 2. For example, if the auxiliary yarns are arranged along every other warp yarns 1 or every several warp yarns 1 or every other weft yarns 2 or every several weft yarns 2, the intended object can be achieved.

Figure 2:
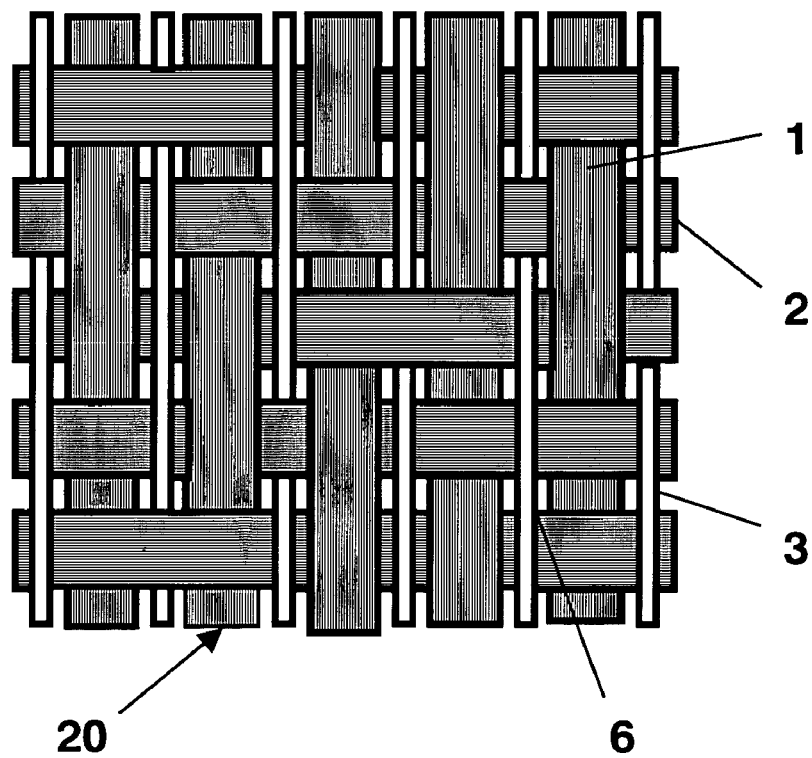
FIG. 2 is a plan view showing another example of the carbon fiber-made reinforcing woven fabric of the invention.

FIG. 2 is a plan view showing a carbon fiber-made reinforcing woven fabric 20 as another example of the invention. In FIG. 2, the carbon fiber-made reinforcing woven fabric 20 comprises a carbon fiber woven fabric composed of carbon fiber warp yarns 1 and carbon fiber weft yarns 2, and warp-oriented auxiliary yarns 3 arranged along the warp yarns 1.

The warp yarns 1 and the weft yarns 2 are interlaced with each other to form a 2/2 twill weave structure in which the over-passing and under-passing frequencies on the front side are equal to those on the reverse side. Between the respectively adjacent warp yarns 1, the warp-oriented auxiliary yarns 3 are arranged to repeat a cycle of passing over and under the weft yarns 2 at 3:1, and this cycle is different from the corresponding cycle repeated by the mating warp yarns 1.

Each of the warp-oriented auxiliary yarns 3 is located between the respectively adjacent warp yarns 1, to fill the gaps 6 formed near the interlaced portions between the warp yarns 1 and the weft yarns 2. In this weave structure, since the warp-oriented auxiliary yarns 3 are arranged to repeat a cycle of passing over and under the weft yarns 2 at 3:1, it can be avoided that the warp-oriented auxiliary yarns 3 are located at the centers of the portions of the weft yarns passing over two mutually adjacent warp yarns. With this weave, it can be prevented that the smoothness on the surface of the woven fabric is impaired.

Since the gaps 6 formed near the interlaced portions between the warp yarns 1 and the weft yarns 2 are covered with the auxiliary yarns 3, it can be prevented that the gaps 6 become devoid of a resin, to form open spaces even if the carbon fiber-made reinforcing woven fabric 20 is wet-processed to produce a prepreg.

Since the warp yarns 1 and the weft yarns 2 form a 2/2 twill weave structure, the cycles of passing over and under repeated by the warp yarns 1 and the weft yarns 2 on the front side of the woven fabric are the same as those on the reverse side, and it does not happen that the CFRP produced by molding the woven fabric impregnated with a resin is warped.

In the carbon fiber-made reinforcing woven fabric 20, the warp yarns 1 and the weft yarns 2 are interlaced with each other while alternately passing over and under every two weft yarns and every two warp yarns. So, compared the carbon fiber-made reinforcing woven fabric 10 having a plain weave structure in which the warp yarns and the weft yarns are interlaced with each other while alternately passing over and under every other weft yarns and every other warp yarns, the carbon fiber-made reinforcing woven fabric 20 are further smaller in the crimps formed by the warp yarns 1 and the weft yarns 2. Moreover, since the carbon fiber-made reinforcing woven fabric 20 has a weave structure likely to be shear-deformed, it has excellent transformability.

In the carbon fiber-made reinforcing woven fabric 20, the auxiliary yarns are arranged in the warp direction only, but the auxiliary yarns can also be arranged in the weft direction.

In the case where the carbon fiber-made reinforcing woven fabric shown in FIG. 1 or FIG. 2 is composed of thick carbon fiber warp yarns 1 and thick carbon fiber weft yarns 2 respectively kept flat in the cross section of the carbon fiber yarns, it has a large degree of freedom in shear deformation. So, it has a feature that it can be transformed into a complicated shape. However, depending on how the auxiliary yarns 3, 4 are interlaced, it can happen that the transformability is impaired. To prevent it, it is preferred to select a weave structure in which the auxiliary yarns are arranged to pass over more mutually adjacent intersecting weft or warp yarns consecutively. For example, it is preferred that the auxiliary yarns are arranged to repeat a cycle of passing over and under the intersecting weft or warp yarns at 2:2, 3:1 or 3:3.

Furthermore, it is preferred that the auxiliary yarns 3, 4 are hardly heat shrinkable fibers, and that a low melting polymer is deposited on the surfaces of the auxiliary yarns. If the auxiliary yarns 3, 4 and the weft yarns 2 or the warp yarns 1 perpendicular to the auxiliary yarns 3, 4 are bonded to each other by means of the low melting polymer at the intersections between the auxiliary yarns 3, 4 and the weft yarns 1 or the warp yarns 2, the condensation of the warp yarns 1 or the weft yarns in the yarn width direction in a wet prepreg production process can be prevented.

Examples of the low melting polymer to be deposited on the surfaces of the auxiliary yarns 3, 4 include a nylon copolymer, copolyester, polyvinylidene chloride, polyethylene and polypropylene, respectively having a melting point of 90 to 200° C. Especially a nylon copolymer is preferred, since it is excellent in adhesion to the resin to be molded for producing a prepreg.

Furthermore, it is preferred that the low melting polymer acting as an adhesive is a polymer selected from polymers hardly soluble in alcohols. In a wet prepreg production process, methanol is popularly used as the diluent of the resin, since it is cheap, has a low boiling point and is easy to dry. In this case, especially a nylon-based polymer is likely to be dissolved in the alcohol, and if the low melting polymer is easily dissolved, it cannot exhibit the action as an adhesive. So, a polymer hardly dissolved in alcohols is preferred.

The polymer hardly soluble in alcohols refers to such a polymer that even if a woven fabric having the polymer deposited is immersed in methanol for 10 minutes, the polymer remains as lumps and does not lose its adhesive function.

The auxiliary yarns having a low melting polymer deposited on the surfaces of hardly heat shrinkable fiber yarns can be, for example, coated yarns produced by coating the surfaces of hardly heat shrinkable yarns with a molten low melting polymer, or covered yarns produced by covering the surfaces of hardly heat shrinkable yarns with fibers made of a low melting polymer.

A covered yarn is produced by winding fibers made of a low melting polymer around a hardly heat shrinkable fiber yarn, particularly a glass fiber yarn used as a core, at a winding rate of 200 to 1000 turns/m in S or Z direction. Double covering consisting of winding in S direction and subsequent winding in Z direction can also be employed. This structure is more preferred, since the torque due to the S-twist of fibers made of the low melting polymer offsets the torque due to the Z-twist, to leave the auxiliary yarns untwisted.

In the case where covered yarns are used, since the low melting polymer exists spirally around the surfaces of the hardly heat shrinkable yarns, it can happen that there are portions free from the low melting polymer in the contact faces at the intersections between the auxiliary yarns and the carbon fiber yarns. To prevent the problem, it is preferred to wind the fibers made of the low melting polymer at a winding rate as high as possible. However, if the winding rate is too high, there arise a problem that the productivity of covering declines, to raise the processing cost. So, it is preferred that the winding rate is in a range from 200 to 800 turns/m.

If the carbon fiber-made reinforcing woven fabric containing auxiliary yarns with a low melting polymer deposited on their surfaces is heated at a temperature higher than the softening point of the low melting polymer, the bonding between the auxiliary yarns and the carbon fiber yarns can be achieved.

It is preferred that the amount of the low melting polymer deposited on the auxiliary yarns is in a range from 0.5 to 10 wt % based on the weight of the carbon fiber woven fabric. If the deposited amount is smaller than 0.5 wt %, the bonding between the auxiliary yarns and the carbon fiber yarns is so insufficient that the effect of using the low melting polymer cannot be exhibited. If the deposited amount is more than 10 wt %, the weight of the carbon fiber-made reinforcing woven fabric increases. Furthermore, since the low melting polymer goes into the carbon fiber yarns, the resin used for producing a prepreg cannot be sufficiently impregnated into the woven fabric, and there arises a problem that the physical properties of the obtained CFRP decline. For these reasons, a more preferred range of the deposited amount is from 1 to 5 wt %.

It is preferred that the areal weight of the carbon fiber-made reinforcing woven fabric is in a range from 100 to 600 $g/m^2$, and a more preferred range is from 190 to 400 $g/m^2$. The range of the real weight can be suitably applied for the aircraft.

As for the reasons why the range is preferred, for example, in the case where thick carbon fiber yarns having a fineness of 3,000 deniers or more are used, if the areal weight of the woven fabric is less than 100 $g/m^2$, the gaps between the carbon fiber yarns become extremely large. In such a case, it is difficult to equalize the gaps between the carbon fiber yarns, and after all, the woven fabric is likely to have open spaces. In this case, even if the woven fabric obtained is uniform, it is unstable in form, and there arises a problem that fibers shift during handling, to form open spaces.

On the contrary, if the areal weight of the woven fabric is more than 600 $g/m^2$, the carbon fibers are highly densely arranged, to reduce the areas of the gaps formed near the interlaced portions between the warp yarns and the weft yarns, and the warp yarns and the weft yarns are strongly constrained. So, the yarns are less condensed in the yarn width direction in a wet prepreg production process, and the effect owing to the existence of the auxiliary yarns in the invention cannot be exhibited.

It is preferred that the cover factor of the carbon fiber-made reinforcing woven fabric is 90% or more. More preferred is 95% or more.

In the case where the carbon fiber-made reinforcing woven fabric is composed of thick carbon fiber yarns and is thin with a low areal weight, the number of gaps formed near the interlaced portions between the carbon fiber warp yarns and the carbon fiber weft yarns is very small, and the auxiliary yarns are arranged in the gaps. So, a high cover factor can be expected. However, since the gaps between the carbon fiber yarns are large, the carbon fiber yarns are likely to vary in yarn width, to increase the area per gap. If the areas of the gaps formed near the interlaced portions between the warp yarns and the weft yarns are too large, the auxiliary yarns arranged in the gaps cannot perfectly cover the gaps, and it may be difficult to prevent that open spaces are formed in a wet prepreg production process. Therefore, it is preferred that the cover factor of the carbon fiber-made reinforcing woven fabric is 90% or more.

The cover factor (Cf) (in %) is a factor concerning the gaps formed among the weaving yarns of the woven fabric. If the area of a region set in the woven fabric is S1 and the area of the gaps formed among the weaving yarns in the area (S1) is S2, then the cover factor is defined by the following formula.

$$Cf(\%)=[(S1-S2)/S1]\times 100$$

Figure 3:
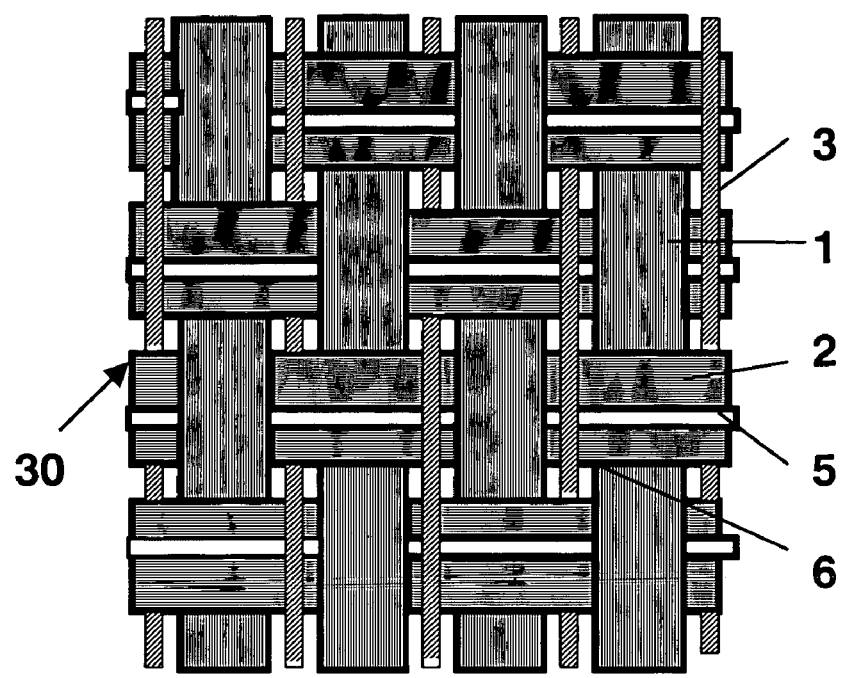
FIG. 3 is a plan view showing still another example of the carbon fiber-made reinforcing woven fabric of the invention.

FIG. 3 is a plan view showing a carbon fiber-made reinforcing woven fabric 30 as a still another example of the invention. In FIG. 3, the carbon fiber-made reinforcing woven fabric 30 comprises a carbon fiber woven fabric composed of carbon fiber warp yarns 1 and carbon fiber weft yarns 2, warp-oriented auxiliary yarns 3 arranged along the warp yarns 1, and a low melting polymer 5 deposited in dots or lines on the weft yarns 2 in the longitudinal direction of the weft yarns 2. FIG. 3 shows a case where the low melting polymer 5 is deposited in lines.

The warp yarns 1 and the weft yarns 2 are interlaced with each other to form a plain weave structure. Only between the respectively adjacent warp yarns 1, each of the warp-oriented auxiliary yarns 3 is arranged. The warp-oriented auxiliary yarns 3 repeat a cycle of passing over and under the weft yarns 2 at 2:2, like the warp-oriented auxiliary yarns 3 shown in FIG. 1.

Moreover, the low melting polymer 5 is deposited in dots or lines on the weft yarns 2, and the warp yarns 1 and the weft yarns 2 intersecting with each other on the weft yarns 2 are bonded to each other at the intersections. This constitution inhibits the condensation of the warp yarns 1 in the yarn width direction.

As for the method for making the low melting polymer 5 deposited on the weft yarns 2 in dots or lines, a fiber yarn made of the low melting polymer 5 is fed closely in parallel with the weft yarn to be inserted, so that the former can be positioned on the weft yarn 2 in the weaving process, and the low melting polymer 5 is heated to a temperature higher than the melting point of the low melting polymer 5 in the loom, using, for example, a far infrared heater. By this method, the low melting polymer 5 can be deposited on the weft yarn 2, and furthermore, the warp yarns 1 and the weft yarns 2 can be bonded to each other at their intersections by means of the low melting polymer 5.

In the carbon fiber-made reinforcing woven fabric 30, the warp yarns 1 and the weft yarns 2 are bonded to each other at their intersections. So, even if the carbon fiber-made reinforcing woven fabric 30 is a wet-processed to produce a prepreg, the phenomenon that the warp yarns 1 are condensed and narrowed in the yarn width direction does not happen.

Figure 4:
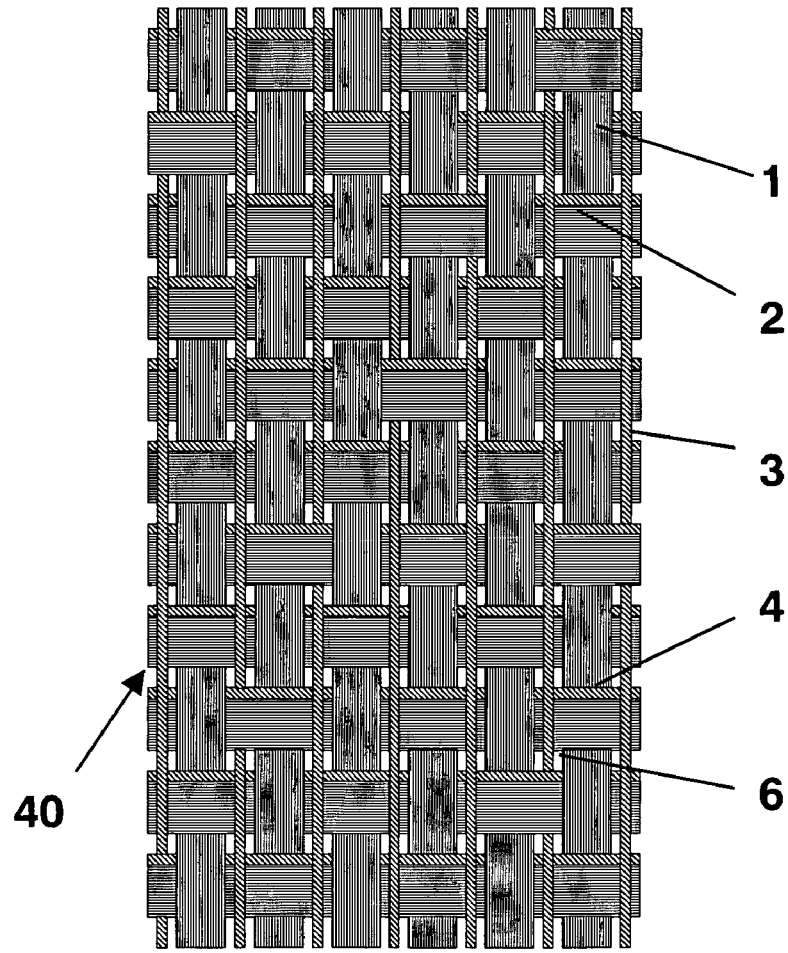
FIG. 4 is a plan view showing a further example of the carbon fiber-made reinforcing woven fabric of the invention.

FIG. 4 is a plan view showing a carbon fiber-made reinforcing woven fabric 40 as a further example of the invention. In FIG. 4, the carbon fiber-made reinforcing woven fabric 40 comprises a carbon fiber woven fabric composed of carbon fiber warp yarns 1 and carbon fiber weft yarns 2, warp-oriented auxiliary yarns 3 arranged along the warp yarns 1 and weft-oriented auxiliary yarns 4 arranged along the weft yarns 2.

The warp yarns 1 and the weft yarns 2 are interlaced with each other to form a plain weave structure. Between the respectively adjacent warp yarns 1, each of the warp-oriented auxiliary yarns 3 is arranged, and between the respectively adjacent weft yarns 2, each of the weft-oriented auxiliary yarns 4 is arranged.

The warp-oriented auxiliary yarns 3 and the weft-oriented auxiliary yarns 4 are respectively hardly heat shrinkable fibers, and they have a low melting polymer deposited on their surfaces. The warp-oriented auxiliary yarns 3 repeat a cycle of passing over and under the intersecting weft yarns 2 at 8:1, and the weft-oriented auxiliary yarns 4 repeat a cycle of passing over and under the intersecting warp yarns 1 at the same ratio as that of the weft yarns 2.

Usually if the warp-oriented auxiliary yarns 3 are interlaced with the weft yarns 2, the gaps 6 formed near the interlaced portions are likely to be enlarged. However, in the present example, the warp-oriented auxiliary yarns 3 are arranged to pass over many weft yarns 2 in each cycle, to decrease the number of interlaced points, and the interlaced portions are positioned at random, to narrow the entire gaps between the weft yarns 2, for preventing that the gaps 6 become large.

It is preferred that the weft-oriented auxiliary yarns 4 are also arranged to pass over many intersecting warp yarns 1 in each cycle, but in this case, it is necessary to insert one weft-oriented auxiliary yarn 4 and one weft yarn 2 separately in the weaving process. So, this method involves a problem that the productivity of the woven fabric is halved. Therefore, in view of productivity, it is preferred that one weft-oriented auxiliary yarn 4 is merely closely paralleled with one weft yarn 2 for weaving.

It is preferred that each of the warp-oriented auxiliary yarns 3 is arranged between the respectively adjacent warp yarns 1. In this case, it can happen that any of the warp-oriented auxiliary yarns 3 moves toward either of the adjacent warp yarns 1, to be positioned on the warp yarn 1. However, the warp-oriented auxiliary yarns 3 repeat a cycle of passing over and under the weft yarns 2, and the cycle is different from the corresponding cycle repeated by the warp yarns 1. So, the warp-oriented auxiliary yarns 3 are placed on any intersecting weft yarns 2 without fail. Therefore, it does not happen that any one of the warp-oriented auxiliary yarns 3 continuously lies under any one of the warp yarns 1. Furthermore, since the warp-oriented auxiliary yarns 3 have a low melting polymer deposited on them, the warp-oriented auxiliary yarns 3 can be reliably bonded to the weft yarns 2 intersecting with the auxiliary yarns. Therefore, even if the carbon fiber-made reinforcing woven fabric 40 are wet-processed to produce a prepreg, the phenomenon that the warp yarns 1 and the weft yarns 2 are condensed and narrowed in the yarn width direction does not happen.

The prepreg of the invention comprises the carbon fiber-made reinforcing woven fabric of the invention impregnated with 30 to 50 wt % of a resin, and has a cover factor of 90% or more.

Examples of the resin (matrix resin) include epoxy resins, phenol resins, unsaturated ester resins and vinyl esters.

Figure 6:
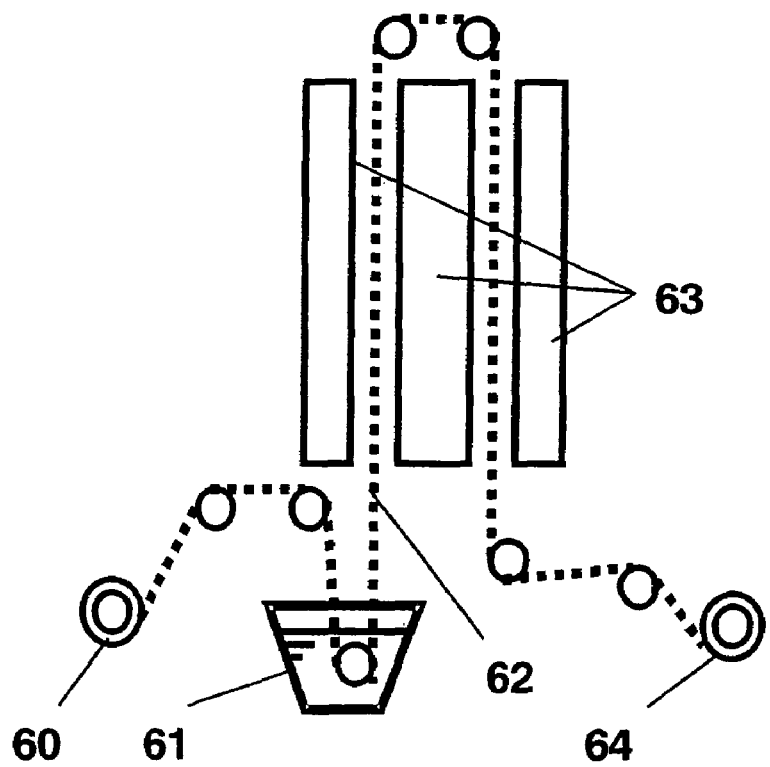
FIG. 6 is a schematic side view showing an example of the production apparatus for carrying out the prepreg production method of the invention.

FIG. 6 is a schematic side view showing an example of the production apparatus used for carrying out the prepreg production method of the invention. The production apparatus per se is usually used for a wet prepreg production process.

In FIG. 6, the carbon fiber-made reinforcing woven fabric 60 of the invention is wound as a roll and supported in such a manner as to allow unwinding from it. The carbon fiber-made reinforcing woven fabric 60 is unwound from it and passes through a resin in a bath containing the resin diluted with a solvent. Then, the sheet 62 formed of the carbon fiber-made reinforcing woven fabric 60 impregnated with the resin passes in a drying furnace having heaters 63 surrounding the sheet 62. In the furnace, the solvent is removed, and the sheet 62 turns into a dried prepreg 64. The obtained prepreg 64 is wound as a roll.

If a step of calendering the obtained prepreg 64 using hot nip rollers heated to 80 to 150° C. is added to the prepreg production method, it has a working effect of widening the width of the carbon fiber yarns used as the warp yarns 1 and the weft yarns 2. In this case, little gaps 6 can be formed near the interlaced portions of the carbon fiber yarns.

EXAMPLE AND COMPARATIVE EXAMPLE

An example of the invention and a comparative example are described below.

Example

The carbon fiber-made reinforcing woven fabric of the invention in this example was the carbon fiber-made reinforcing woven fabric 30 shown in FIG. 3.

The warp yarns 1 and the weft yarns 2 were respectively carbon fiber yarns each comprising 12,000 filaments and having a fineness of 7,200 deniers ("Torayca" T700 produced by Toray Industries, Inc.).

The carbon fiber woven fabric formed of the warp yarns 1 and the weft yarns 2 had arrangement densities of 1.20 yarns/cm as the densities of both the warp yarns 1 and the weft yarns 2. The areal weight of the carbon fiber woven fabric was 193 g/m$^2$, and the weave structure was a plain weave.

The warp-oriented auxiliary yarns 3 were glass fiber yarns each having a fineness of 203 deniers. The glass fiber yarns were doubly covered with a low melting nylon fiber yarn with a melting point of 145° C. and a fineness of 70 deniers ("Joiner" produced by Fuji Spinning Co., Ltd.) at a winding rate of 250 turns/m in both S and Z directions.

Each of the warp-oriented auxiliary yarns 3 was arranged between the respectively adjacent warp yarns 1. The warp-oriented auxiliary yarns 3 and the weft yarns 2 intersecting with them formed a 2/2 twill weave structure.

The low melting polymer 5 on the weft yarns 2 was a low melting nylon fiber yarn having a melting point of 145° C. and a fineness of 70 deniers. The low melting nylon fiber yarn was closely paralleled with each of the weft yarns 2, to be woven.

A far infrared heater was used to heat the woven fabric at 160° C., a temperature higher than the melting point of the low melting nylon fiber yarns used for covering the glass fiber yarns and as the low melting polymer 5, to fuse the low melting nylon fibers, for bonding the warp-oriented auxiliary yarns 3 and the weft yarns 2 to each other and for bonding the warp yarns 1 and the weft yarns 2 to each other, thereby producing the carbon fiber-made reinforcing woven fabric 30. The cover factor of the carbon fiber-made reinforcing woven fabric 30 was 99.5%.

Then, from the carbon fiber-made reinforcing woven fabric 30, a 200 mm long and 150 mm wide specimen was taken. The specimen was immersed in a solution containing a phenol resin ("Shownol" BRS330 produced by Showa Highpolymer Co., Ltd.) diluted with methanol to have a specific gravity of 0.96, and suspended, and a heat gun was used to dry away methanol, with the distance between the heat gun and the specimen kept at 200 mm, to obtain a prepreg. The temperature of the hot air blown from the heat gun was adjusted to be 162° C. as the temperature at a place of 200 mm apart from the tip of the heat gun.

The cover factor of the obtained prepreg was 96.0%, being somewhat smaller than that of the original carbon fiber-made reinforcing woven fabric 30. This value does not pose any practical problem as a prepreg.

Comparative Example

A woven fabric was prepared as described for the Example, except that the auxiliary yarns 3 and the low melting polymer 5 were not used. That is, the woven fabric was a carbon fiber woven fabric formed of the carbon fiber warp yarns 1 and the carbon fiber weft yarns 2 only. The cover factor of the woven fabric was 99.1%. A prepreg was produced using the woven fabric as described for the Example.

In the prepreg production process, when methanol was dried away, it was observed that the methanol in the woven fabric was boiled to frequently move the carbon fibers, while gradually narrowing the yarn width. The cover factor of the obtained prepreg was 81.7%, and the prepreg had large voids, i.e., large open spaces formed near the intersections between the carbon fiber yarns. The prepreg was not practical.

INDUSTRIAL APPLICABILITY

The carbon fiber-made reinforcing woven fabric of the invention comprises a carbon fiber woven fabric formed of carbon fiber warp yarns and carbon fiber weft yarns, and auxiliary yarns arranged along at least either the warp yarns or the weft yarns, characterized in that the auxiliary yarns repeat a cycle of passing over and under the intersecting weft or warp yarns, the cycle being different from the corresponding cycle repeated by their mating warp or weft yarns. This constitution provides a woven fabric having a structure, in which the gaps formed near the intersections between the warp yarns and the weft yarns of the woven fabric are covered with the auxiliary yarns.

In the case where the woven fabric is impregnated with a matrix resin in a wet prepreg production process and where the woven fabric impregnated with the matrix resin is dried, auxiliary yarns exist in the gaps formed near the intersections between the warp yarns and the weft yarns of the woven fabric. So, the matrix resin remains around the auxiliary yarns. Thus, a prepreg substantially free from open spaces can be provided.

In the case where yarns with a low melting polymer deposited on the surfaces of hardly heat shrinkable fiber yarns are used as the auxiliary yarns, the low melting polymer allows the auxiliary yarns and the carbon fibers to be bonded to each other. As a result, a prepreg substantially free from the fluctuation in the width of the carbon fiber yarns and having a large cover factor can be provided.

Since the carbon fiber-made reinforcing woven fabric of the invention has the above-mentioned constitution, thick carbon fiber yarns flat in cross sectional figure can be used as the carbon fiber yarns. So, the productivity of the carbon fiber yarns and the productivity of the woven fabric formed of them can be enhanced, and a woven fabric with the crimps of weaving yarns kept small can be produced. Therefore, low cost and yet high-quality CFRP exhibiting the high strength and high modulus peculiar to carbon fibers can be provided.

The invention claimed is:

1. A prepreg, comprising a carbon fiber-made reinforcing woven fabric impregnated with 30 to 50 wt % of a resin, and having a cover factor of not less than 90%, wherein the carbon fiber-made reinforcing woven fabric comprises, warp yarns each of which comprises carbon fibers and weft yarns each of which comprises carbon fibers, and auxiliary yarns each of which comprises a glass fiber yarn and arranged along at least either the warp yarns comprising the carbon fibers, as warp-oriented auxiliary yarns or the weft yarns comprising the carbon fibers, as weft-oriented auxiliary yarns, wherein each of the warp-oriented auxiliary yarns or the weft-oriented auxiliary yarns is arranged in an up and down pattern of passing over and under the weft yarns or the warp yarns, respectively, at an up/down frequency such that an up/down frequency of a selected warp-oriented auxiliary yarn with respect to the weft yarns is different from that of an adjacent warp yarn or an un/down frequency of a selected weft-oriented auxiliary yarn with respect to the warp yarns is different from that of an adjacent weft yarn, and wherein each of the auxiliary yarns is arranged between the warp yarns adjacent each other or the weft yarns adjacent each other, and wherein the respective fineness of each of the warp yarns and each of the weft yarns are in a range from 3,000 to 90,000 deniers, and the glass fiber yarn has a fineness of not more than 500 denier.

2. The prepreg, according to claim 1, wherein each of the auxiliary yarns is arranged between the warp yarns adjacent each other and the weft yarns adjacent each other.

3. The prepreg, according to claim 1, wherein a low melting point polymer is adhered on the surface of each of the auxiliary yarns, and wherein portions of the intersections between the auxiliary yarns and the warp yarns or the weft yarns are bonded by means of the low melting point polymer.

4. The prepreg, according to claim 3, wherein an adhering amount of the low melting point polymer is in a range from 0.5 to 10 wt % based on the weight of the reinforcing woven fabric.

5. The prepreg, according to claim 3, wherein the low melting point polymer is adhered on the surface of the auxiliary yarn spirally in at least either S-direction or Z-direction.

6. The prepreg, according to claim 3, wherein the low melting point polymer is a polymer having a hardly soluble property in alcohol.

7. The prepreg, according to claim 1, wherein an areal weight of the carbon fiber woven fabric is in a range from 100 to 600 g/m$^2$.

8. The prepreg, according to claim 1, wherein a low melting point polymer is adhered dottedly or lineally on at least either the warp yarns or the weft yarns in the longitudinal direction of the yarns, and wherein portions of the intersections between the warp yarns and the weft yarns are bonded by means of the low melting point polymer.

9. The prepreg, according to claim 1, wherein the warp yarns and the weft yarns form a plain weave structure.

10. The prepreg, according to claim 1, wherein the warp yarns and the weft yarns form a 2/2 twill weave structure.

11. The prepreg, according to claim 1, wherein the warp yarns and the weft yarns form a plain weave structure; each of the auxiliary yarns is arranged between the warp yarns adjacent each other and is adhered with a polyamide having a low melting point on the surface thereof spirally at least in either S-direction or Z-direction; and each of the auxiliary yarns is arranged with at least two continuous ups pattern to the weft yarns.

12. The prepreg, according to claim 11, wherein each of the auxiliary yarns has a two continuous ups pattern after a two continuous downs pattern to the weft yarns.

13. The prepreg, according to claim 11, wherein each of the auxiliary yarns is arranged between the weft yarns adjacent each other and is adhered with a polyamide having a low melting point on the surface thereof spirally at least in either S-direction or Z-direction, and portions of the intersections between the auxiliary yarns arranged along the weft yarns and the warp yarns are bonded by means of the polyamide having a low melting point.

14. The prepreg, according to claim 11, wherein a polyamide having a low melting point is adhered dottedly or lineally on the weft yarns in the longitudinal direction of the yarns, and wherein portions of the intersections between the warp yarns and the weft yarns are bonded by means of the polyamide having a low melting point.

* * * * *

UNITED STATES PATENT AND TRADEMARK OFFICE
CERTIFICATE OF CORRECTION

PATENT NO. : 7,361,618 B2  Page 1 of 1
APPLICATION NO. : 10/499241
DATED : April 22, 2008
INVENTOR(S) : Homma et al.

It is certified that error appears in the above-identified patent and that said Letters Patent is hereby corrected as shown below:

In Column 16:

At line 9, please change "un/down" to --up/down--.

Signed and Sealed this

Eighth Day of July, 2008

JON W. DUDAS
*Director of the United States Patent and Trademark Office*